United States Patent
Stanfill et al.

(10) Patent No.: US 8,762,604 B2
(45) Date of Patent: *Jun. 24, 2014

(54) MANAGING BUFFER CONDITIONS THROUGH SORTING

(71) Applicant: Ab Initio Technology LLC, Lexington, MA (US)

(72) Inventors: Craig W. Stanfill, Lincoln, MA (US); Carl Richard Feynman, Waban, MA (US)

(73) Assignee: AB Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/799,249

(22) Filed: Mar. 13, 2013

(65) Prior Publication Data

US 2013/0297904 A1 Nov. 7, 2013

Related U.S. Application Data

(63) Continuation of application No. 13/031,034, filed on Feb. 18, 2011, now Pat. No. 8,447,901.

(51) Int. Cl.
*G06F 3/00* (2006.01)

(52) U.S. Cl.
USPC .............................................. 710/52; 710/56

(58) Field of Classification Search
USPC ...................................... 710/53, 56
See application file for complete search history.

(56) References Cited

U.S. PATENT DOCUMENTS

| | | | |
|---|---|---|---|
| 5,410,672 A | 4/1995 | Sodek, Jr. et al. | |
| 5,867,663 A | 2/1999 | McClure et al. | |
| 5,966,072 A | 10/1999 | Stanfill et al. | |
| 5,996,031 A | 11/1999 | Lim et al. | |
| 6,088,716 A | 7/2000 | Stanfill et al. | |
| 6,161,155 A | 12/2000 | Simms et al. | |
| 6,401,147 B1 | 6/2002 | Sang et al. | |
| 6,842,800 B2 | 1/2005 | Dupont | |
| 6,925,539 B2 | 8/2005 | Mowery et al. | |
| 7,003,597 B2 | 2/2006 | Georgiou | |
| 7,164,422 B1 | 1/2007 | Wholey, III et al. | |
| 7,213,087 B1* | 5/2007 | Bertone et al. | 710/56 |
| 8,332,555 B2* | 12/2012 | Sutardja | 710/74 |
| 8,447,901 B2 | 5/2013 | Stanfill et al. | |
| 2002/0149788 A1 | 10/2002 | Nishikata et al. | |

(Continued)

FOREIGN PATENT DOCUMENTS

| | | |
|---|---|---|
| CA | 2271669 | 5/2000 |
| JP | 11175281 | 7/1999 |

OTHER PUBLICATIONS

Transaction History, U.S. Appl. No. 13/031,034, Jul. 3, 2013, 3 pages.

(Continued)

*Primary Examiner* — Ernest Unelus
(74) *Attorney, Agent, or Firm* — Fish & Richardson P.C.

(57) ABSTRACT

Systems and techniques include, in some implementations, a computer implemented method storing a portion of data elements present in a first buffer in a second buffer in response to detecting an overflow condition of the first buffer, wherein the data elements in the first buffer are sorted according to a predetermined order, and inserting a proxy data element in the first buffer to represent the portion of data elements stored to the second buffer.

52 Claims, 3 Drawing Sheets

(56) References Cited

U.S. PATENT DOCUMENTS

| | | |
|---|---|---|
| 2003/0126336 A1 | 7/2003 | Creta et al. |
| 2006/0120405 A1 | 6/2006 | Engbersen |
| 2007/0168583 A1 | 7/2007 | Kim |
| 2008/0104313 A1 | 5/2008 | Chu |
| 2008/0301336 A1* | 12/2008 | Bilak et al. ............ 710/56 |
| 2009/0125666 A1 | 5/2009 | Freking et al. |
| 2009/0327372 A1 | 12/2009 | Ylonen |
| 2011/0238872 A1 | 9/2011 | Sutardja |
| 2012/0215992 A1 | 8/2012 | Stanfill et al. |
| 2012/0215997 A1 | 8/2012 | Stanfill et al. |

OTHER PUBLICATIONS

Transaction History, U.S. Appl. No. 13/031,056, Jul. 3, 2013, 2 pages.

Liebeherr, Jörg, et al., "Priority Queue Schedulers with Approximate Sorting in Output-Buffered Switches." IEEE Journal on Selected Areas in Communications, vol. 17, No. 6, Jun. 1999, pp. 1127-1144.

Lotan, Itay, "Skiplist-Based Concurrent Priority Queues," Proceedings of the 14$^{th}$ International Parallel and Distributed Processing Symposium, May 1, 2000, 23 pages.

Managing Buffer Conditions, 19 pages.

Morris, John, "8.3 Hash Tables." Data Structures and Algorithms, 1998, 4 pages.

Pugh, William (Jun. 1990). "Skip lists: a probabilistic alternative to balanced trees". Communications of the ACM 33 (6): 668-676.

Seidel, R. et al., "Randomized Search Trees." Algorithmica (1996) 16: 464-497.

Sorting, 21 pages.

Xu, Haifeng, et al., "Client Architecture for MPEG-4 Streaming," Digital Media on Demand, IEEE Computer Society, 2004, 8 pages.

Aragon, Cecilia, et al., "Randomized Search Trees," Annual Symposium on Foundations of Computer Science, Research Triangle Park, Oct. 30-Nov. 1, 1989, 6 pages.

Eddy, C., "Inline Buffered Sort," VelocityReviews.com, Apr. 18, 2005, http://www.velocityreviews.com/forums/ tl42842-inline-buffered-sort.html, 3 pages.

International Search Report & Written Opinion, PCT/US2012/025441, mailed Jun. 8, 2012, 5 pages.

International Search Report & Written Opinion, PCT/US2012/025375, mailed Oct. 16, 2012, 11 pages.

* cited by examiner

MANAGING BUFFER CONDITIONS THROUGH SORTING

CLAIM OF PRIORITY

This application is a continuation application and claims priority under 35 U.S.C. §120 to U.S. patent application Ser. No. 13/031,034 filed on Feb. 18, 2011, the entire contents of which are hereby incorporated by reference.

BACKGROUND

This description relates to managing buffer conditions.

Similar to various data processing techniques, buffer management techniques play an important role in many applications. In one implementation, buffer overflow conditions may cause significant disruptions in a computer system, for example, when attempting to store an amount of data that exceeds memory capacity, processing may be slowed or outright halted. To stem the overflow, data may be written into other memory areas that may have been obligated to other purposes, thereby also potentially causing the slowdown or termination of processing.

SUMMARY

In one aspect, in general, a computer implemented method can include storing a portion of data elements present in a first buffer in a second buffer in response to detecting an overflow condition of the first buffer, wherein the data elements in the first buffer are sorted according to a predetermined order, and inserting a proxy data element in the first buffer to represent the portion of data elements stored to the second buffer.

Aspects can include one or more of the following.

The predetermined order of the data elements in the first buffer can include a priority order for removal of the data elements from the first buffer. The portion of data elements stored to the second buffer can be substantially sorted according to the predetermined order. The portion of data elements stored to the second buffer can include at least half the data elements stored the first buffer. The method can include storing data elements in the locations of the first buffer corresponding to the portion of data elements saved to the second buffer. The method can include removing one or more data elements from the first buffer according to the predetermined order; and providing the removed one or more data elements from the first buffer as an output stream of data elements that are substantially sorted according to the predetermined order. The method can include merging one or more data elements from the second buffer with the data elements in the first buffer in response to the proxy data element becoming a highest priority data element of the stored elements in the first buffer. The method can include merging one or more data elements from the second buffer with the data elements in the first buffer in response to the proxy data element being identified for removal from the first buffer. The merged data elements can be sorted based upon the predetermined order. Merging can occur substantially simultaneous with producing an output data element. The proxy data element can be a copy of an element from the second buffer having a highest priority for removal from the second buffer. The removed one or more data elements can include a data element from the first buffer that represents a smallest value of the elements in the first buffer. The removed one or more data elements can include a data element from the first buffer that represents a largest value of the elements in the first buffer. The method can include applying a boundary condition to the data elements stored in the first buffer, and ejecting one or more data elements from the first buffer based on the boundary condition as an output stream of data elements sorted according to the predetermined priority order.

Each data element can represent a data record production time. Applying a boundary condition to the data elements stored in the first buffer can include identifying a data element as representing the smallest value of the data elements stored in the first buffer, and determining the difference between the data element representing the smallest value and a data element received for entering in the first buffer. Ejecting one or more data elements from the first buffer based on the boundary condition can include determining if one or more data elements exceed a predetermined value; and ejecting the one or more data elements from the first buffer if the one or more data elements exceeds the predetermined value. At least one of the first and second buffers can be implemented by a skip list data structure. At least one of the first and second buffers can be implemented by a treap data structure. One or more of the individual data elements in first and second buffers can be derived from data records that are input to a component in a graph-based computation system.

In another aspect, in general, a computer-readable storage medium storing a computer program for sorting data elements can include instructions for causing a computing system to store a portion of data elements present in a first buffer in a second buffer in response to detecting an overflow condition of the first buffer, wherein the data elements in the first buffer are sorted according to a predetermined order; and insert a proxy data element in the first buffer to represent the portion of data elements stored to the second buffer.

In another aspect, in general, a computing system for sorting data elements can include a data storage system for storing a portion of data elements present in a first buffer in a second buffer, and at least one processor coupled to the data storage system and configured to process the received stream of data elements. The processing can include storing the portion of data elements present in a first buffer in a second buffer in response to detecting an overflow condition of the first buffer, wherein the data elements in the first buffer are sorted according to a predetermined order, and inserting a proxy data element in the first buffer to represent the portion of data elements stored to the second buffer.

In another aspect, in general, a computing system for sorting data elements includes a means for storing a portion of data elements present in a first buffer in a second buffer, and a means for processing the received stream of data elements. The processing can include storing the portion of data elements present in a first buffer in a second buffer in response to detecting an overflow condition of the first buffer, wherein the data elements in the first buffer are sorted according to a predetermined order, and inserting a proxy data element in the first buffer to represent the portion of data elements stored to the second buffer.

Aspects can include one or more of the following advantages.

In some examples, a first buffer and its contents may be stored in fast memory, e.g., random access memory (RAM). During operation, it may be more desirable to store certain portions of the first buffer in slower memory (e.g., hard disk). For example, certain elements in the primary buffer may not be needed immediately and thus may be removed to a second buffer that may be stored in the slower memory. One or more secondary buffers, may be employed to temporarily store elements that are not immediately needed. These elements can be restored to the first buffer when a substantially equal number of elements residing in the first buffer are no longer present thereby providing appropriate space for the elements.

Further, in some implementations involving a mostly sorted received stream of data elements, the elements may be for the most part in sorted order except for a few that are not in proper order with the majority of the elements. By applying a boundary condition to the data elements stored in a primary buffer after receiving each individual data element of the stream, an output stream of data elements can be produced that is sorted according to a predetermined order.

Other features and advantages of the invention will become apparent from the following description, and from the claims.

DESCRIPTION

Figure 1:
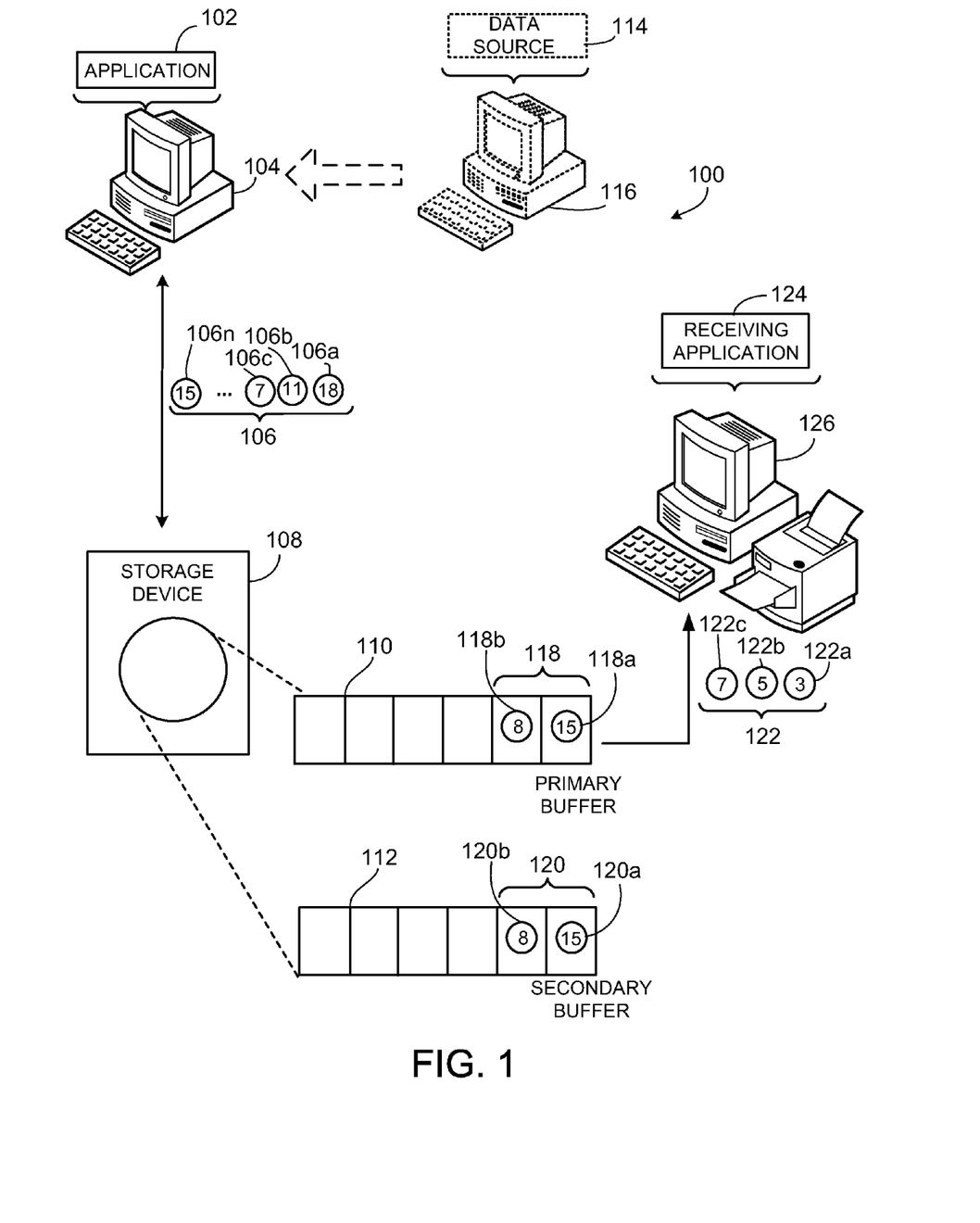
FIG. 1 is a block diagram of a buffer management system.

Referring to FIG. 1, an example buffer management system 100 includes an application 102 (e.g., a sorting application) executed on a computer system 104 (e.g., a server such as a Web server servicing one or more client systems) that stores data elements 106a-n (generally 106) in a storage device 108. The storage device 108 may be, for example, a hard drive memory or other removable storage media having multiple buffers (as illustrated with two buffers 110, 112), and may be implemented as part of the computer system 104 or a separate stand alone memory device. In some examples, the first buffer 110 may be located in a first memory, e.g., a random access memory, and the second buffer 112 may be located in hard disk.

The elements 106 may represent various types of information, for example, values assigned to one or more attributes of data records (not shown) generated by the sorting application 102. In some implementations, the elements 106 can represent values resulting from computations performed on one or more data records. Other information that may be represented by the elements 106 can include timestamps, e.g., respective times when the corresponding data records were created by the sorting application 102.

While the sorting application 102 may provide a variety of different functions, in one example, the sorting application 102 may be a window sorting application described in further detail in co-pending U.S. application Ser. No. 13/031,056, the contents of which are incorporated herein by reference in their entirely. In some examples, the sorting application 102 may not produce the data elements 106, but optionally receive them from a second, different application 114 (e.g., executed on a computer system 116) for sorting.

Sorting herein refers to a process of putting the elements 106 of the received stream into a certain order. For example, the sorting application 102 may output the elements in ascending order of their numeric values. In operation, the sorting application 102 stores the incoming stream of unsorted elements (e.g., elements arriving from a data source application 114) in the buffer 110 that is referred to as a primary buffer. The elements may be stored in a substantially sorted manner as stored elements 118a-b (generally 118). However, there may be a relatively significant number of elements (e.g., millions) in the incoming stream that may evidentially cause the primary buffer 110 to become unable to store all of the provided elements. For example, the primary buffer 110 may reach capacity based upon its maximum physical memory size. As a result of such situations, the primary buffer 110 may overflow and cause operations of the computer system 104 to be disrupted and potentially halted.

To alleviate such problems, one or more "spill-over basins" or secondary buffers, such as the buffer 112, may be employed to temporarily store the overflowing elements, represented in FIG. 1 as elements 120a-b (generally 120).

In some examples, the primary buffer and its contents may be stored in fast memory, e.g., random access memory (RAM). During operation, it may be more desirable to store certain portions of the primary buffer in slower memory (e.g., hard disk). For example, certain elements in the primary buffer may not be needed immediately and thus may be removed to a secondary buffer that may be stored in the slower memory. To address such situations, the one or more secondary buffers, such as the buffer 112, may be employed to temporarily store elements that are not immediately needed as the elements 120a-b.

These elements 120 may be restored to (e.g., merged back into) the primary buffer 110 when a substantially equal number of elements residing in the primary buffer 110 are no longer present (e.g., ejected elements 122a-b), thereby providing appropriate space for the elements 120.

To provide a sorted output, the sorting application 102 performs operations to ensure that the ejected elements 122 are in a substantially sorted order. For example, the ejected elements 122 are ejected such that smaller (or larger, depending on the preferred output) valued elements are ejected first followed by larger (smaller) valued elements. For the example in which the elements represent timestamp values, the elements associated with the most recent timestamp (or oldest, depending on the preferred output) may be ejected from the buffer. The ejected elements 122 may be provided for additional processing, as illustrated, to a receiving application 124 executed by another computer system 126. The receiving application 120 is representative of a type of software application capable of receiving and processing the ejected elements 122.

Figure 2:
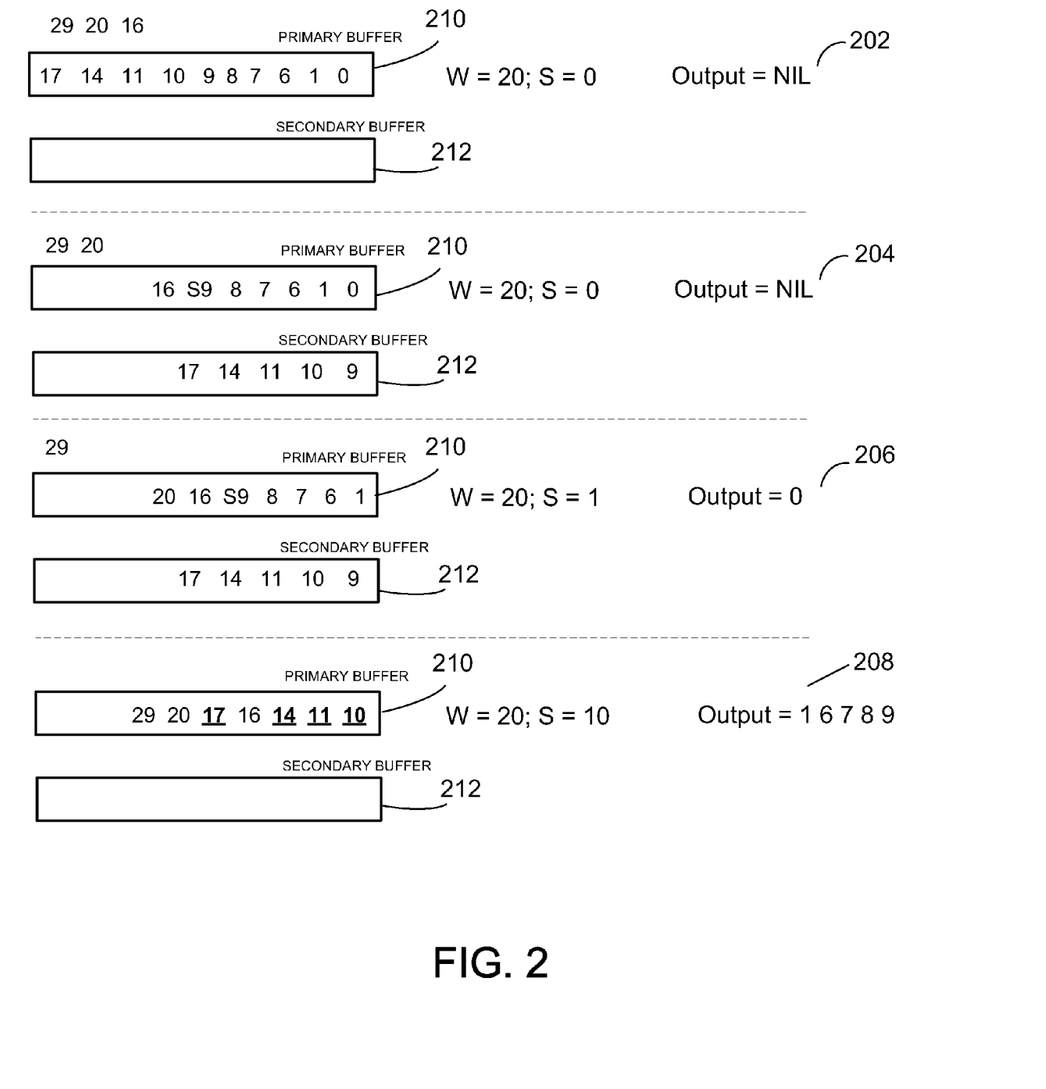
FIG. 2 illustrates buffers through a series of management operations.

FIG. 2 is a diagrammatic representation of states 202-208 of a pair of buffers 210 and 212 (e.g., the primary buffer 110 and the secondary buffer 112 shown in FIG. 1) illustrating operations for managing buffer overflow. The order of incoming elements may be provided in a variety of orders such as a completely random order or somewhat deterministic (e.g., partially sorted, mostly sorted, etc.). In a mostly sorted scenario, the elements may be for the most part in sorted order except for a few outliers (compared to the majority). To quantify such outliers, for a stream having a relatively significant number of elements (e.g., millions), approximately 0.1-10% of the elements may be out of order. To efficiently insert such outlier elements into proper locations within a stream having a large number of elements, the sorting application may exploit the fact that the majority of elements arrive appropriately ordered. For example, the incoming elements, including the outliers, may be stored (e.g., by the sorting application 102) in a primary buffer 210 in a sorted manner. For the majority of elements that arrive already sorted, the storing of the elements in the buffer 210 is a relatively efficient process. However, additional time may be needed when outliers arrive at the buffer and need to be inserted in appropriate positions within the primary buffer 210.

Typically, the stored elements are ejected from the primary buffer 210 based upon one or more rules. For example, a value associated with each stored element (e.g., numerical value) may be used to determine if the corresponding element should be ejected. The order in which the elements are stored may also factor into determining whether or not to eject one or more elements from the primary buffer 210. At appropriate times, the sorting application 102 ejects the elements in the primary buffer 210 in a prioritized manner according to the sorted order (e.g., ascending order, descending order, etc.). Further, an element may be ejected when a condition imposed on the stored elements (e.g., a maximum allowable difference between any two stored elements) is violated. Once ejected from the primary buffer 210, the resulting elements form a sorted output stream of elements.

If the elements are sorted according to ascending order of the numerical values, smaller elements may be initially ejected while larger valued elements may be ejected at a later time. Similarly, for elements sorted according to descending order, larger elements may be ejected at an earlier time while smaller valued elements may be ejected later. Such numerical values associated with each element may represent one or more quantities.

The buffers 210, 212 can be implemented by one or more types of data structures and architectures for storing data elements and ejecting the elements in a particular sorted order (e.g., priority queue data structures). In one implementation, the sorting application 102 may be able to provide a variety of functions for sorting data elements using the data structures. For example, in one arrangement, three functions may be predominately used on a data structure selected to define primary and secondary buffers.

For one of the three functions, the sorting application 102 is able to insert an element in an appropriate location in the data structure as determined by the prevailing sort order of stored elements in the structure. For example, consider stored elements arranged in ascending order of their numerical values. The sorting application 102 may be able to insert a new incoming element in an appropriate location in the data structure based on the numerical value of the incoming element. As a second function, the sorting application may be able to identify one or more elements for being ejected from the structure based upon an ejection priority order (e.g., eject the smallest or largest data element in the buffer). Third, the sorting application may provide a function to initiate the ejection of an identified element or elements residing in the structure.

In one arrangement, each of the primary buffer 210 and secondary buffer 212 can be a balanced binary tree data structure (e.g., a heap binary tree data structure). Generally, a heap binary tree data structure (often just referred to as a heap) satisfies two conditions. One condition may be that the priorities of children nodes included in the tree structure are at least as large as the priority of the parent nodes. A second condition may be that the heap is a "complete tree", i.e., a tree in which every row is full, i.e., there are no gaps (i.e., unfilled nodes) between leaf nodes, except possibly for the bottom row.

In some examples, the buffers 210, 212 may be implemented by skip list data structures. In general, a skip list data structure and its associated algorithms are a variant of a linked linear list and may improve sorting performance in situations calling for frequent insertions of keyed data elements. A skip list data structure may include an ordered, linked linear list of data elements (or nodes), in which some elements have additional pointers that skip intermediate data elements, thus increasing the speed and efficiency of searches of data elements.

By implementing the buffers 210, 212 as skip list data structures, retrieval times may be O(1) time to retrieve a smallest data element. Insertion times of O(1) time may be needed to appropriately insert a data element (e.g., element is inserted adjacent to a most recently inserted element). Insertion time may be O(log N) time if the insertion location is not adjacent to the most recently inserted element. Ejection times may be O(k) time to read out "k" elements (e.g., elements with the largest values). Skip list data structures are described in further detail in a paper by William Pugh, entitled "Skip lists: A probabilistic alternative to Balanced trees," Communications of the ACM. June 1990, pp. 668-676, the contents of which are incorporated herein by reference in their entirety.

Other techniques may also be utilized, for example, the buffers 210, 212 can be implemented by treap data structures. A treap data structure is a binary search tree in which each node has a randomly assigned priority attribute as well as a key. The nodes are in order with respect to their keys as in a typical binary search tree. That is, with respect to the keys a left subtree of a node contains only nodes with keys less than the node's key, while the right subtree of the node contains only nodes with keys greater or equal than the node's key. In addition, the nodes are in "heap order" with respect to their priority attributes such that each child node has a priority attribute that is at least as large as a parent node's priority attribute. Treap data structures are further described in a paper by Aragon, Cecilia R., and Seidel, Raimund, entitled "Randomized Search Trees", Proc. 30th Symp. Foundations of Computer Science (FOCS 1989), the contents of which are incorporated herein by reference in their entirety.

In one implementation, the sorting application 102 may cause a boundary condition to be applied on the primary buffer 210, which is used to determine whether and when an element from the primary buffer is to be ejected. The boundary condition may take the form of a "window" of element values permitted to be stored in the primary buffer. The window may represent a maximum allowable difference between any two stored data elements in the primary buffer. As such, a "width" of the window represents a range of values permitted in the primary buffer. For example, the window width may be defined by calculating the difference between a smallest and largest element in the primary buffer 210.

The boundary condition can be considered binary in that the condition may be considered satisfied or unsatisfied (e.g., violated). For example, the boundary condition can be regarded as being satisfied as long as no incoming element causes the window width to be exceeded. Conversely, the boundary condition can be regarded as being violated if the window width to be exceeded. Upon violation of the boundary condition one or more actions may be executed, for example, one or more elements in the primary buffer 210 may be ejected according to an ejection priority order.

Various techniques may be used for defining parameters associated with a window, e.g., the window width can be specified by a user or predefined. For example, based upon the particular application (e.g., sorting based upon telephone call termination time) the window width may defined. In some contexts, the window width corresponds to a measure of "out-of-orderness", e.g., a measure that outlier elements may be tolerated. For example, consider a context involving timestamped data elements. The window width indicates how late a timestamped element can be provided to the primary buffer relative to a timestamped element currently in the buffer (e.g., a smallest or largest timestamped element). In one arrangement, if the widow width (in units of time) is 4 hours, the primary buffer 210 may store all time-stamped elements within the 4 hour window (as defined by the smallest time-stamped element in the primary buffer). Time-stamped elements arriving outside the 4 hour may be discarded, separately processed, etc.

As illustrated in FIG. 2, information about individual contents of the primary buffer 210, a window width of the primary buffer 210 (referenced with label W), a smallest element currently in the primary buffer 210 (referenced with label S), and current output data elements is provided for each state 202-208. In this example, the elements are stored in ascending order and the incoming stream appears mostly sorted in ascending order. Based upon the sorting, an output stream is provided that is substantially sorted in ascending order. For demonstrative purposes, the example is shown as operating on a stream of about thirteen elements, however, the process may operate on streams with more or less elements, for example, a continuous stream of elements may be inputted and sorted by the process.

In initial state 202, a window width value is predetermined to be 20 (e.g., a difference between a smallest and largest element in the primary buffer 210 does not exceed or equal a value of 20). As shown, the primary buffer 210 is full, and thus unable to store any more elements. The current smallest valued element in the primary buffer 210 has a value of 0 (and is represented by S=0 in the state 202). Since no elements have been ejected, the current output is represented by "NIL", i.e., there are no output data elements. Also, the secondary buffer 212 is currently empty.

In state 204, a next incoming element, with a value of 16 is to be inserted in the primary buffer 210. However, while the appropriate location for element 16 is in between the elements of values 17 and 14, the primary buffer 210 currently lacks the needed space to insert the element where the element of value 17 may be moved to make room for the element of value 16. To make room, a predetermined portion (e.g., half) of the stored elements in the primary buffer 210 may be removed and provided to the secondary buffer 212, and the element of value 16 may be stored in a newly available location in the primary buffer 210. For example, the larger half of the stored elements (i.e., elements of values 17, 14, 11, 10, 9) may be moved to the secondary buffer 212. In some examples, the predetermined portion is selected based on a predefined rule.

One advantage of removing the larger half of stored elements is maximization of the time needed to merge back the elements into the primary buffer 210. The time needed to remove the elements and write them to the secondary buffer 212 is on the order of O(k) time, where k is the number of removed elements. The removed elements also can be stored in the secondary buffer 212 in sorted order. Further, a proxy element (e.g., labeled in the primary buffer as S9) may be inserted into the primary buffer 210 at an appropriate location. Proxy elements are used to represent (e.g., within the primary buffer 210) the elements that have been removed and stored in the secondary buffer 212. Proxy elements may be represented in various fashions, for example, by changing a Boolean field (flag) appended to the data element representing the proxy element. The location of the proxy element can be established by the prevailing order of the remaining elements in the primary buffer 210. For example, in this demonstration since the smallest value of the removed elements has a value of 9, the proxy element S9 can be inserted between the newly inserted element of value 16 and element of value 8. For state 204, because the difference between the smallest and largest elements in the primary buffer 210 is 16, which is still less than the window width, 20, the boundary condition is not considered as being violated, and thus no data elements need to be ejected.

In state 206, as shown, several locations have become available in the primary buffer 210 for storing elements. The next incoming element of value 20 is inserted into the primary buffer at an appropriate location, i.e., after the element of value 16. Based upon this insertion, the difference between the smallest and largest elements in the primary buffer 210 is 20, which is equal to the window width, 20, hence violating the boundary condition. As such, elements are ejected from the primary buffer 210 in order of their ejection priorities (e.g., ascending order) for as long as the boundary condition is violated. The smallest element in the primary buffer 210 is of value 0, which is ejected. The next smallest element is now of value 1. Since the difference between the smallest and largest elements in the primary buffer 210 is 19 for this state, which is less to the window width, 20, the boundary condition is not violated. Consequently, no more elements need to be ejected from the primary buffer 210.

In state 208, when the element of value 29 is to be inserted into the primary buffer 210, the difference between the smallest and largest elements becomes 28 (i.e., 29 minus 1), which is greater than the window width, 20. The boundary condition is violated, and thus elements of values 1, 6, 7, and 8 are ejected from the primary buffer 210. The proxy element S9 would now also violate the boundary condition since 29 minus 9 is 20.

In this situation, the elements from the secondary buffer 212 may be merged back with the elements in the primary buffer 210 such that the combined elements are stored in order. For the convenience of the reader, the newly merged elements in the primary buffer 210 are shown with bold and underlined font. In general, for a primary buffer 210 implemented by a skip list data structure, the time needed to merge the elements back into the primary buffer 210 is on the order of $O(k \log(n/k))$ time, where "n" is the number of elements in the primary buffer 210 and "k" is the number of elements being merged. After the merger is complete, the element of value 9 may be ejected from the buffer since this element had caused the boundary condition to be violated (29 minus 9 is 20). As such, the smallest element in the buffer is now of value 10, which does not violate the boundary condition. Consequently, no further elements are ejected from the primary buffer.

Typically, when the merging occurs, the number of elements ejected from the primary buffer is equivalent to the number of elements residing in the secondary buffer. For example, four elements are ejected from the primary buffer to provide space for four elements from the secondary buffer (the fifth element of value 9 is ejected after the merger).

Variants in buffer architecture such as the number may be achieved in some implementations. For example one primary buffer and two or more secondary buffers may be utilized. Similar to multiple buffers, multiple proxy elements may be stored in the primary buffer each corresponding to multiple secondary buffers storing elements. When a proxy element becomes a highest ejection priority element in the primary buffer, elements from the corresponding secondary buffer are merged into the primary buffer.

In some examples, the secondary buffer may be filled to capacity and another, different buffer (e.g., tertiary buffer) may be used to store the overflow elements. A proxy element may be inserted at an appropriate location in the secondary buffer to represent the overflow elements stored in the tertiary buffer.

The length of the secondary buffers (and therefore the file sizes corresponding to these buffers) depend on the number of elements removed from the primary buffer when the overflow condition occurs. For example, an optimal file size involves removing as many elements (e.g., up to at least half the number of elements) from the primary buffer as will allow for efficient use of the primary buffer. A further consideration is minimization of the number of removal and merging operations.

Figure 3:
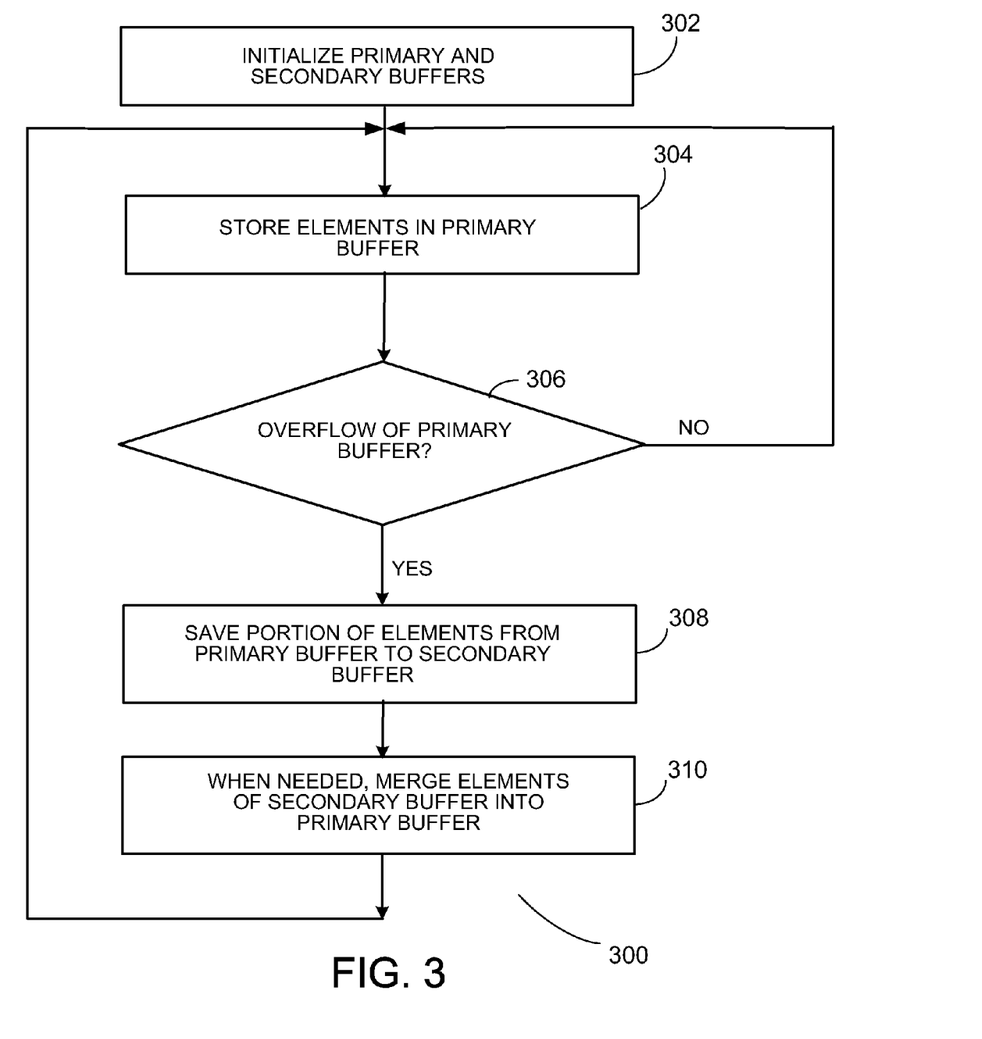
FIG. 3 is a flowchart of a buffer management process.

Referring now to FIG. 3, a flowchart that represents operations of an exemplary buffer overflow management process 300 for managing an overflow condition of a buffer is shown.

In an implementation, the steps outlined below may be carried out by a software application executed on a computer system. As a preliminary matter, the primary and secondary buffers are initialized. (Step 302) The initialization can include specifying a memory area, e.g., a plurality of contiguous memory addresses, for storing incoming elements. As part of initialization, a boundary condition can be specified on the primary buffer. For example, a variable can be defined to hold a value corresponding to a window width for the primary buffer. The window width may represent a maximum allowable difference between any two stored data element values in the primary buffer.

After the boundary condition on the primary buffer is defined, the primary buffer is ready to receive the incoming stream of data elements. However, when the primary buffer reaches capacity, an overflow condition occurs. (Step 304) The overflow condition occurs when no more elements can be accommodated in the primary buffer. In this situation, a portion (e.g., half) of the stored elements in the primary buffer may be removed and stored in a secondary buffer. (Step 306) A sentinel, i.e., proxy element, may be inserted into the primary buffer at an appropriate location to represent the removed elements. When, the proxy element needs to be ejected from the buffer, the stored elements in the secondary buffer are merged into the primary buffer in a sorted order. (Step 308) The process 300 may be repeated for every incoming element for as long as there are incoming elements.

The techniques described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner wherein different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

The invention claimed is:

1. A computer implemented method, including:
    moving, by a processor, one or more data elements that are stored in a first buffer into a second buffer in response to detecting an overflow condition of the first buffer, wherein the data elements that are stored in the first buffer are sorted according to a predetermined order;
    creating a proxy element in the first buffer that references the data elements moved into the second buffer;
    moving one or more of the data elements that are stored in the second buffer into the first buffer based on a position of the proxy element in the first buffer, wherein the data elements that are moved into the first buffer are stored in the first buffer according to the predetermined order;
    specifying a maximum allowable difference between values of any two data elements stored in the first buffer; and
    applying a boundary condition to the one or more data elements that are stored in the first buffer, wherein the boundary condition is representative of the specified maximum allowable difference between values of any two data elements stored in the first buffer.

2. The method of claim 1, including:
    when the boundary condition is not satisfied, ejecting one or more data elements from the first buffer.

3. The method of claim 2, wherein the predetermined order is a priority order for ejection of the data elements from the first buffer.

4. The method of claim 3, including:
    merging the one or more data elements that are moved into the first buffer with data elements that are stored in the first buffer in response to the proxy element becoming a high priority data element.

5. The method of claim 2, wherein the one or more data elements ejected from the first buffer are one or more high priority data elements.

6. The method of claim 5, wherein ejecting one or more high priority data elements from the first buffer includes providing the ejected one or more high priority data elements from the first buffer as an output stream of data elements that are substantially sorted according to the predetermined order.

7. The method of claim 1, wherein applying a boundary condition to the one or more data elements that are stored in the first buffer includes:
    determining the difference between a value of a data element representing a smallest or a largest value of the one or more data elements that are stored in the first buffer and a value of a received data element.

8. The method of claim 1, wherein the proxy element references a data element from the second buffer having a highest priority for removal from the second buffer.

9. The method of claim 1, wherein the one or more data elements moved into the second buffer are substantially sorted according to an order based on the predetermined order.

10. The method of claim 1, including:
merging the one or more data elements that are moved into the first buffer with data elements that are stored in the first buffer.

11. The method of claim 10, wherein the merged data elements are sorted according to the predetermined order.

12. The method of claim 10, including:
merging the one or more data elements when the proxy element is identified for ejection from the first buffer.

13. The method of claim 1, wherein creating a proxy element includes inserting the proxy element into the first buffer.

14. A non-transitory computer-readable storage medium storing a computer program for sorting data elements, the computer program including instructions for causing a computer system to:
move one or more data elements that are stored in a first buffer into a second buffer in response to detecting an overflow condition of the first buffer, wherein the data elements that are stored in the first buffer are sorted according to a predetermined order;
create a proxy element in the first buffer that references the data elements moved into the second buffer;
move one or more of the data elements that are stored in the second buffer into the first buffer based on a position of the proxy element in the first buffer, wherein the data elements that are moved into the first buffer are stored in the first buffer according to the predetermined order;
specify a maximum allowable difference between values of any two data elements stored in the first buffer; and
apply a boundary condition to the one or more data elements that are stored in the first buffer, wherein the boundary condition is representative of the specified maximum allowable difference between values of any two data elements stored in the first buffer.

15. A computing system for sorting data elements, the computing system including:
a data storage system for storing data elements in a first buffer and a second buffer; and
at least one processor coupled to the data storage system and configured to process a received stream of data elements, the processing including:
moving one or more data elements that are stored in the first buffer into the second buffer in response to detecting an overflow condition of the first buffer, wherein the data elements that are stored in the first buffer are sorted according to a predetermined order;
creating a proxy element in the first buffer that references the data elements moved into the second buffer;
moving one or more of the data elements that are stored in the second buffer into the first buffer based on a position of the proxy element in the first buffer, wherein the data elements that are moved into the first buffer are stored in the first buffer according to the predetermined order;
specifying a maximum allowable difference between values of any two data elements stored in the first buffer; and
applying a boundary condition to the one or more data elements that are stored in the first buffer, wherein the boundary condition is representative of the specified maximum allowable difference between values of any two data elements stored in the first buffer.

16. A computing system for sorting data elements, the computing system including:
means for moving one or more data elements that are stored in a first buffer into a second buffer in response to detecting an overflow condition of the first buffer, wherein the data elements that are stored in the first buffer are sorted according to a predetermined order;
means for creating a proxy element in the first buffer that references the data elements moved into the second buffer;
means for moving one or more of the data elements that are stored in the second buffer into the first buffer based on a position of the proxy element in the first buffer, wherein the data elements that are moved into the first buffer are stored in the first buffer according to the predetermined order;
means for specifying a maximum allowable difference between values of any two data elements stored in the first buffer; and
means for applying a boundary condition to the one or more data elements that are stored in the first buffer, wherein the boundary condition is representative of the specified maximum allowable difference between values of any two data elements stored in the first buffer.

17. The non-transitory computer-readable storage medium of claim 14, wherein the computer program includes instructions for causing the computer system to:
when the boundary condition is not satisfied, eject one or more data elements from the first buffer.

18. The non-transitory computer-readable storage medium of claim 17, wherein the predetermined order is a priority order for ejection of the data elements from the first buffer.

19. The non-transitory computer-readable storage medium of claim 18, wherein the computer program includes instructions for causing the computer system to:
merge the one or more data elements that are moved into the first buffer with data elements that are stored in the first buffer in response to the proxy element becoming a high priority data element.

20. The non-transitory computer-readable storage medium of claim 17, wherein the one or more data elements ejected from the first buffer are one or more high priority data elements.

21. The non-transitory computer-readable storage medium of claim 20, wherein ejecting one or more high priority data elements from the first buffer includes providing the ejected one or more high priority data elements from the first buffer as an output stream of data elements that are substantially sorted according to the predetermined order.

22. The non-transitory computer-readable storage medium of claim 14, wherein applying a boundary condition to the one or more data elements that are stored in the first buffer includes:
determining the difference between a value of a data element representing a smallest or a largest value of the one or more data elements that are stored in the first buffer and a value of a received data element.

23. The non-transitory computer-readable storage medium of claim 14, wherein the proxy element references a data element from the second buffer having a highest priority for removal from the second buffer.

24. The non-transitory computer-readable storage medium of claim 14, wherein the one or more data elements moved into the second buffer are substantially sorted according to an order based on the predetermined order.

25. The non-transitory computer-readable storage medium of claim 14, wherein the computer program includes instructions for causing the computer system to:
merge the one or more data elements that are moved into the first buffer with data elements that are stored in the first buffer.

26. The non-transitory computer-readable storage medium of claim 25, wherein the merged data elements are sorted according to the predetermined order.

27. The non-transitory computer-readable storage medium of claim 25, wherein the computer program includes instructions for causing the computer system to:
merge the one or more data elements when the proxy element is identified for ejection from the first buffer.

28. The non-transitory computer-readable storage medium of claim 14, wherein creating a proxy element includes inserting the proxy element into the first buffer.

29. The computing system of claim 15, the processing including:
when the boundary condition is not satisfied, ejecting one or more data elements from the first buffer.

30. The computing system of claim 29, wherein the predetermined order is a priority order for ejection of the data elements from the first buffer.

31. The computing system of claim 30, the processing including:
merging the one or more data elements that are moved into the first buffer with data elements that are stored in the first buffer in response to the proxy element becoming a high priority data element.

32. The computing system of claim 29, wherein the one or more data elements ejected from the first buffer are one or more high priority data elements.

33. The computing system of claim 32, wherein ejecting one or more high priority data elements from the first buffer includes providing the ejected one or more high priority data elements from the first buffer as an output stream of data elements that are substantially sorted according to the predetermined order.

34. The computing system of claim 15, wherein applying a boundary condition to the one or more data elements that are stored in the first buffer includes:
determining the difference between a value of a data element representing a smallest or a largest value of the one or more data elements that are stored in the first buffer and a value of a received data element.

35. The computing system of claim 15, wherein the proxy element references a data element from the second buffer having a highest priority for removal from the second buffer.

36. The computing system of claim 15, wherein the one or more data elements moved into the second buffer are substantially sorted according to an order based on the predetermined order.

37. The computing system of claim 15, the processing including:
merging the one or more data elements that are moved into the first buffer with data elements that are stored in the first buffer.

38. The computing system of claim 37, wherein the merged data elements are sorted according to the predetermined order.

39. The computing system of claim 37, the processing including:
merging the one or more data elements when the proxy element is identified for ejection from the first buffer.

40. The computing system of claim 15, wherein creating a proxy element includes inserting the proxy element into the first buffer.

41. The computing system of claim 16, including:
means for, when the boundary condition is not satisfied, ejecting one or more data elements from the first buffer.

42. The computing system of claim 41, wherein the predetermined order is a priority order for ejection of the data elements from the first buffer.

43. The computing system of claim 42, including:
means for merging the one or more data elements that are moved into the first buffer with data elements that are stored in the first buffer in response to the proxy element becoming a high priority data element.

44. The computing system of claim 41, wherein the one or more data elements ejected from the first buffer are one or more high priority data elements.

45. The computing system of claim 44, wherein means for ejecting one or more high priority data elements from the first buffer includes means for providing the ejected one or more high priority data elements from the first buffer as an output stream of data elements that are substantially sorted according to the predetermined order.

46. The computing system of claim 16, wherein means for applying a boundary condition to the one or more data elements that are stored in the first buffer includes:
means for determining the difference between a value of a data element representing a smallest or a largest value of the one or more data elements that are stored in the first buffer and a value of a received data element.

47. The computing system of claim 16, wherein the proxy element references a data element from the second buffer having a highest priority for removal from the second buffer.

48. The computing system of claim 16, wherein the one or more data elements moved into the second buffer are substantially sorted according to an order based on the predetermined order.

49. The computing system of claim 16, including:
means for merging the one or more data elements that are moved into the first buffer with data elements that are stored in the first buffer.

50. The computing system of claim 49, wherein the merged data elements are sorted according to the predetermined order.

51. The computing system of claim 49, including:
means for merging the one or more data elements when the proxy element is identified for ejection from the first buffer.

52. The computing system of claim 16, wherein creating a proxy element includes inserting the proxy element into the first buffer.

* * * * *